United States Patent [19]

Jenkins et al.

[11] Patent Number: 5,739,196
[45] Date of Patent: Apr. 14, 1998

[54] LATEX COMPOSITIONS HAVING WET ADHESION AND OTHER IMPROVED RHEOLOGICAL PROPERTIES AND METHODS OF PRODUCING SAME

[75] Inventors: Richard Duane Jenkins; Victor Vincent Kaminski, III, both of Cary; William Charles Arney, Jr., Raleigh; David Robinson Bassett, Cary, all of N.C.

[73] Assignee: Union Carbide Chemicals & Plastics Technology Corporation, Danbury, Conn.

[21] Appl. No.: 565,727

[22] Filed: Nov. 30, 1995

[51] Int. Cl.$^6$ .................................................. C08F 2/16
[52] U.S. Cl. .................. 524/460; 523/201; 524/458; 524/516; 524/517; 524/522; 524/530; 524/549; 525/193; 525/207
[58] Field of Search ................ 523/201; 524/460, 524/549, 458, 516, 530, 517, 522; 525/193, 207

[56] References Cited

U.S. PATENT DOCUMENTS

| | | | |
|---|---|---|---|
| 4,150,005 | 4/1979 | Gehman et al. | 524/460 X |
| 4,151,143 | 4/1979 | Blank et al. | 260/29.6 |
| 4,725,655 | 2/1988 | Denzinger et al. | 524/460 X |
| 4,876,313 | 10/1989 | Lorah | 525/281 |
| 4,894,397 | 1/1990 | Morgan et al. | 523/201 |
| 4,916,171 | 4/1990 | Brown et al. | 523/161 |
| 5,073,591 | 12/1991 | Tsaur | 524/460 |
| 5,118,749 | 6/1992 | Knutson | 524/460 |
| 5,139,882 | 8/1992 | Elser et al. | 526/318.44 X |
| 5,157,071 | 10/1992 | Ingle | 524/555 |
| 5,286,779 | 2/1994 | Chuang et al. | 524/460 |
| 5,312,863 | 5/1994 | Van Rheenen et al. | 524/560 X |
| 5,395,877 | 3/1995 | Pucknat et al. | 524/460 |
| 5,403,894 | 4/1995 | Tsai et al. | 528/285 |
| 5,468,800 | 11/1995 | Fölsch et al. | 524/460 X |
| 5,530,056 | 6/1996 | Farwaha et al. | 526/320 X |
| 5,563,187 | 10/1996 | Chiou et al. | 524/460 X |

FOREIGN PATENT DOCUMENTS

587333A3  3/1994  European Pat. Off. .

*Primary Examiner*—Judy M. Reddick
*Attorney, Agent, or Firm*—W. K. Volles

[57] ABSTRACT

The present invention relates to latex compositions having desirable wet adhesion and other rheological properties. The processes of the invention allow for preparation of a first polymer which, upon addition of a base or neutralizing agent, substantially dissolves the first polymer, thereby providing a medium for polymerization of a second polymer, stabilizing the second polymer and acting as a dispersant for other coating composition components such as pigments, coalescents, fillers and the like.

10 Claims, No Drawings

LATEX COMPOSITIONS HAVING WET ADHESION AND OTHER IMPROVED RHEOLOGICAL PROPERTIES AND METHODS OF PRODUCING SAME

BACKGROUND OF THE INVENTION

The present invention relates to latex compositions having wet adhesion and other improved rheological properties and emulsion polymerization processes for producing the same.

In the field of architectural coatings, as well as with paints, varnishes, inks and adhesives, formulators have been required to balance latex characteristics which are usually directly opposed to each other, yet required in order to obtain a commercially viable product. For example, a paint must form a film (i.e. low Tg) while at the same time this film must resist blocking or sticking to itself while drying (i.e. high Tg). The film must be water resistant (i.e. water insoluble) yet many of the ingredients must be water-soluble so that the paint can be waterborne. The development of mixtures of blends of alkali-soluble polymers with alkali-insoluble polymers has been utilized to address problems such as chemical and water resistance.

The first generation of such polymers were prepared by solution polymerization as illustrated in U.S. Pat. No. 4,151,143, which discloses a surfactant-free emulsion polymer coating composition and method for preparing the same. The method includes (1) a first stage wherein a carboxyl group containing polymer is prepared by a conventional solution or bulk polymerization technique and then water-dispersed or solubilized by partial or full neutralization with an organic amine or base and high shear agitation, and (2) a second stage polymerization wherein a mixture of polymerizable monomers and polymerization catalyst is added to the first-stage emulsion at an elevated temperature to affect polymerization of the stage two monomers resulting in the formation of an emulsion coating composition. The coating composition is alleged to be surfactant-free.

Second generation alkali-soluble and alkali-insoluble polymers were prepared using "core-shell technology." So-called "core-shell" polymers are formed when the alkali-soluble polymers form a "shell" or coating around a discreet domain or "core" of the alkali-insoluble polymer. Examples of such core-shell polymers are disclosed in U.S. Pat. No. 4,916,171. Further improvements were made by chemically grafting the alkali-soluble shell and alkali-insoluble polymer core using methods such as those described in U.S. Pat. No. 4,876,313 and U.S. Pat. No. 5,403,894.

"Inverse core-shell" emulsion polymers have also been disclosed. Inverse core-shell polymers are those where the second-stage polymer becomes the core and is surrounded by the shell which, in the inverse process, is the first stage polymer. These inverse compositions can be formed when the first stage polymer is more hydrophilic than the second stage monomer, U.S. Pat. No. 4,894,397.

U.S. Pat. No. 5,073,591 describes a method for producing highly acidic polymeric emulsions by a two-stage method wherein the first stage contains a high level of acid monomer and crosslinker, and the second stage contains an amino-containing monomer.

EP 0 587 333 A2 describes water-resistant multi-stage polymers having an alkali-insoluble polymer and an alkali-soluble polymer which are prepared by sequential emulsion polymerization of a monomer mixture having acid functionality in the alkali-soluble stage and, optionally, a polyfunctional compound; and an alkali-insoluble polymer having, optionally, an amine functionality.

While core-shell polymers have provided improvements in some polymer properties, the challenge remains to develop a latex polymer that simultaneously possesses superior performance in gloss, block resistance, rheology build, adhesion, pigment dispersion and other properties. The present invention provides methods of producing multifunctional latex compositions having both wet adhesion and other improved rheological properties.

SUMMARY OF THE INVENTION

The present invention relates to latex compositions having desirable wet adhesion and other rheological properties. The processes of the invention allow for the preparation of a first polymer which, upon addition of a base, substantially dissolves the first polymer thereby providing a medium for polymerization of a second polymer, stabilizing the second polymer and acting as a dispersant for other coating composition components such as pigments, coalescents, fillers and the like.

Polymerization of the first polymer is typically by emulsion polymerization of a mixture of monomers comprising at least one acid or anhydride functional monomer or monomer that imparts alkaline solubility to the first polymer, and a variety of comonomers such as alkyl acrylates/methacrylates, styrenes or substituted styrenes, acrylamides, methacrylate or hydroxyalkyl esters of a carboxylic acid. The reaction is carried out in the presence of a wet adhesion promoter, capable of providing wet adhesion properties, to form the first polymer.

A base or neutralizing agent is then added to the first polymer so as to substantially dissolve the first polymer, and provide a medium for emulsion polymerization of a second polymer. The second polymer is also formed using a variety of suitable monomers containing, for example, acrylic, styrenic, vinyl or versatic functionalities, and the like.

In one embodiment of the invention, the first polymer, as prepared, may be stored for later neutralization or neutralized and used as a dispersant medium for other latex polymers including emulsion polymerization of the second polymer of the present invention.

In another embodiment, latex polymers prepared by the process of the present invention, with or without the addition of a wet adhesion promoter, may be blended with latexes having wet adhesion to provide synergistic improvements in rheological properties.

In yet mother embodiment, latex polymers prepared by the process of the present invention, with wet adhesion properties, may be blended with convention latexes not having wet adhesion to provide synergistic improvements in rheological properties of the conventional latexes.

The processes of the invention provide polymers useful in compositions such as architectural coatings, industrial and automotive coatings, sealants, adhesives, paper coating compositions, inks, varnishes and the like.

DETAILED DESCRIPTION OF THE INVENTION

Polymerization of the first polymer is typically an emulsion polymerization of a mixture of monomers comprising at least one acid or anhydride functional monomer or monomer that imparts alkaline solubility to the first polymer, reacted with a variety of comonomers, in the presence of a wet adhesion promoter.

Suitable acid or anhydride functional monomers include acrylic acid, methacrylic acid, ethacrylic acid, alphachloroacrylic acid, crotonic acid, citraconic acid, mesaconic acid, itaconic acid, maleic acid, fumaric acid, 3-acrylamido-3-methylbutanoic, acrylic anhydride, methacrylic anhydride, ethacrylic anhydride, crotonic anhydride, citraconic anhydride, mesaconic anhydride, itaconic anhydride, maleic anhydride, fumaric anhydride, p-styrene carboxylic acid, p-styrene sulfonic acids, vinyl sulfonic acid, 2-sulfoethyl methacrylate, 3-sulfopropyl methacrylate, 3-sulfopropylacrylate, 2-acrylamido-2-methylpropane sulfonic acid, and the like including mixtures thereof. In one embodiment of the present invention, the preferred acid monomer is selected from the group consisting of acrylic acid and methacrylic acid.

The amount of carboxyl functionality present in the first polymer determines whether or not the first polymer will actually be soluble on addition of a base. A minimum amount of carboxyl functionality is needed to solubilize the polymer depending on the hydrophobicity of the comonomers, molecular weight of the polymer, chemical nature of the carboxyl monomer and sequence distribution of monomers in the polymers. The amount of carboxyl functionality influences the rheology of both the latex and subsequent paints and influences how the first polymer interacts with pigments. Carboxylated polymers can improve or degrade adhesion, depending on the paint system and substrate. When used in excess, carboxyl groups render the paint film water sensitive, and thereby hurt wet adhesion. Based on the above criteria, the preferred weight of acid or anhydride functional monomers or monomer that imparts alkaline solubility, present in the first polymer is preferably about 5 percent to 50 percent; more preferably from about 8 percent to 20 percent, and most preferably from about 10 percent to 15 percent, based on the total weight of monomers charged.

Illustrative of comonomers useful in polymerization of the first polymer are monomers such as methyl acrylate, ethyl acrylate, butyl acrylate, 2-ethylhexyl acrylate, decyl acrylate, methyl methacrylate, ethyl methacrylate, butyl methacrylate, hydroxyethyl methacrylate, hydroxy propyl methacrylate, styrene, substituted styrene such as alpha methyl styrene, acrylonitrile, vinyl acetate, and other $C_1$–$C_{12}$ alkyl or hydroxy alkyl acrylates and methacrylates, vinyl 2-ethyl-hexanoate, vinyl propionate, vinyl neodecanoate, vinyl neononanoate, vinyl versatate, vinyl pivalate and the like, and/or mixtures thereof.

It is desirable that the first polymer have a low to moderate number average molecular weight, preferably less than about 20,000, as determined by gel permeation chromatography. The molecular weight is controlled by the addition of a suitable chain transfer agent as is known in the art. The preferred chain transfer agents are those having a chain transfer constant of at least $1 \times 10^6$ or greater, and are present in a range of from $2.5 \times 10^{-3}$ moles of chain transfer agent per hundred grams of monomer charged or greater. Examples of suitable chain transfer agents include, for example, alkyl mercaptans such as octyl mercaptan and decyl mercaptan, esters of mercaptoacetic acid, such as an ethyl ester of mercaptoacetic acid and 2-ethylhexyl ester of mercaptoacetic acid, and esters of mercapto- propionic acid, such as isooctyl ester of mercaptopropionic acid. In a preferred embodiment, the chain transfer agent may be selected from the group consisting of 2-ethylhexyl mercaptopropionate and iso-octyl mercaptopropionate or mixtures thereof.

A wet adhesion promoter is preferably incorporated during polymerization of the first polymer to provide wet adhesion properties to both the first polymer and final latex product. Preferred wet adhesion promoters include compounds having an amino, ureido or N-heterocyclic group, such as dialkylaminoalkyl esters and dialkylaminoalkyl amides of acrylic or methacrylic acid, particularly those having from 1 to 5 carbon atoms in the alkyl groups; free radically polymerizable compounds of urea, ethylene urea, or propylene urea; and polymerizable imidazolidinones having a —NC(O)N— group as part of a cyclic five member ring structure.

Examples of wet adhesion promoters that provide the desired wet adhesion properties include dimethylaminoethyl acrylate, diethylamino acrylate, dimethylaminopropyl acrylate, 3-dimethyl-amino-2,2-dimethylpropyl-1-acrylate, 2-N-morpholinoethyl acrylate, 2-N-piperi-dinoethyl acrylate, N-(3-dimethylaminopropyl acrylamide (as used herein includes methacrylamide), N-(3-dimethyl-amino-2,2-dimethyl-propyl)acrylamide, N-dimethylomaminomethyl acrylamide, N-(4-morpho-linomethyl) acrylamide, N-(2-methacryloyloxyethyl) ethylene urea, methacrylamidoethyl ethylene urea, N-(2-methacryl-oxyacetamidoethyl-N,N,N',N'-ethylene urea, allylalkyl ethylene urea, N-methacrylamido-methyl urea, N-methacryoyl urea, N-[3-(1,3-diazocyclohexan-2-on-propyl)]methacrylamide, 2-(1-imid-azolyl)ethyl methacrylate, 2-(1-imidazolidin-2-on) ethyl methacrylate, vinyl-imidazole, vinylpyrrolidone, and 3-allyl-4,5-methoxy-2-imid-azolidinone. Most preferred wet adhesion promoters include N-(2-methacryloyloxyethyl) ethylene urea, and methacrylamidoethyl ethylene urea. In addition, it has been found that propylene imine may be post-reacted with the first polymer or final polymer to provide wet adhesion properties and also be used as a neutralizing agent to substantially dissolve the first polymer.

The amount of wet adhesion promoter present during emulsion polymerization of the first polymer typically ranges from about 0.1 to 10 percent, more preferably from about 1 to 8 percent, and most preferably from about 2 to 5 percent, based on the total weight of the monomer composition charged. In a preferred embodiment of the process of the invention, the first polymer contains a wet adhesion promoter that attributes wet adhesion to the final system; optionally, a wet adhesion promoter may be incorporated in the second polymer composition, or both polymers.

In carrying out the emulsion polymerization, at least one initiator or catalyst is used at a concentration sufficient to initiate or catalyze the polymerization reaction. The concentration of initiator and/or catalyst will vary based on the weight of monomers charged. The particular concentration used in any instance will depend upon the specific monomers mixture undergoing reaction and the specific initiator employed; as is well known to those skilled in the art, and is frequently from about 0.01 to 3 weight percent; more preferably from about 0.05 to 2 weight percent and most preferably from about 0.1 to 1 weight percent based on the weight of monomers charged. It is also known that traces of metal ions can be added as activators to improve the rate of polymerization, if desired. Illustrative of suitable initiators are hydrogen peroxide, peracetic acid, t-butyl hydroperoxide, ammonium persulfate, potassium persulfate, sodium persulfate, as well as any of the other known initiators. Also useful are the redox catalyst systems such as sodium persulfate-sodium formaldehyde sulfoxylate, cumene hydroperoxide-sodium metabisulfite, hydrogen peroxide-ascorbic acid, and the other known redox systems.

The polymerizable feed compositions can also contain any of the other known additives conventionally used in emulsion polymerization processes in the usual known quantities, such as crosslinkers, dispersion aids, emulsifiers, photosensitizers, colorants, bactericides, fungicides, etc.

After formation of the first polymer, a neutralizing agent or base is added to the first polymer to substantially dissolve the polymer. Substantial dissolution of the first polymer is typically indicated by a change from a normal opaque latex appearance of the solution to a translucent, mostly clear or even clear solution. Suitable bases include ammonia, triethylamine, monoethanolamine, dimethylaminoethanol, ammonium hydroxide, sodium hydroxide, potassium hydroxide, calcium hydroxide and all other Group I A and II A hydroxides and the like. As discussed above, propylene imine may also be effective for neutralization of the first polymer, while at the same time providing wet adhesion properties to the final product.

Based on equivalents of acid in the first polymer, 0.5 to 1.5 equivalents of a neutralizing agent or base may be added to neutralize and substantially dissolve the first polymer, thereby forming a stabilized dispersant medium for polymerization of the second polymer. The elimination of discrete particles during this step distinguishes this process from prior art core-shell polymerization processes in which the core particles remain as discrete particles dispersed in solution and shell polymers are coated on the core and/or remain attached to the core, or are chemically grafted to the core.

By using the substantially dissolved first polymer as the medium for emulsion polymerization of a second polymer, the final product has been found to exhibit desirable film forming properties, wet adhesion properties and other rheological characteristics.

Various methods of preparing the polymer compositions of this invention may be used. In one embodiment, the first polymer composition may be prepared in a separate step to yield latex polymers useful in the preparation of other compositions such as dispersants, water-soluble polymer compositions and small particle size latex compositions; blended with conventional latexes; or stored as prepared for later neutralization. In a further embodiment, the first polymer may be neutralized to substantially dissolve the first polymer. This substantially dissolved first polymer may be blended with conventional latexes or used as a dispersant medium for emulsion polymerization of second polymers according to the processes of the present invention.

Monomers useful for polymerization in the second polymer include any monomers which have acrylic, styrenic, vinyl or versatic functionality. Illustrative of such monomers are acrylate and methacrylate esters, styrene, alkyl styrenes, vinyl toluene, vinyl acetate, vinyl alcohol, acrylonitrile, vinylidene chloride, and vinyl ketones. Other illustrative monomers useful in this invention include, for example, propyl methacrylate, isopropyl methacrylate, butyl methacrylate, n-amyl methacrylate, sec-amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, hydroxy ethyl methacrylate, hydroxy propyl methacrylate, vinyl propionate, vinyl butyrate, vinyl tert-butyrate, vinyl caprate, vinyl stearate, vinyl laurate, vinyl oleate, vinyl methyl ether, vinyl ethyl ether, vinyl n-propyl ether, vinyl isopropyl ether, vinyl n-butyl ether, vinyl isobutyl ether, vinyl isooctyl ether, vinyl phenyl ether, α-chlorovinyl phenyl ether, vinyl naphthyl ether, methacrylonitrile, acrylamide, methacrylamide, N-alkyl acrylamides, N-aryl acrylamides, N-vinyl pyrrolidone, N-vinyl-3-morpholinones, N-vinyl-oxazolidone, N-vinyl-imidazole and the like including mixtures thereof.

Optional ingredients which may be included in polymerization of the second polymers include small amounts of other multi-functional monomers such as vinyl esters, crosslinkers, chain transfer agents, carboxyl functional monomers, and others, as known in the art.

The desired ratio for polymerization of the second polymer monomer feed into the substantially dissolved first polymer medium covers a wide range depending on the desired properties of the final latex composition, and the acid level in each polymer. For example, the amount of first polymer incorporated into the second polymer may be small when using a more highly carboxylated material (e.g. 10 parts per hundred resin of a 20% methacrylic acid monomer in the first polymer) or larger amount when using a less carboxylated material (e.g. 20 parts per hundred resin of a 10% methacrylic acid monomer in the first polymer). Suitable ranges include from about 1:99 to about 99:1. Preferably the weight ratio of second polymer monomer feed is from about 85:15 to 15:85, more preferably from about 75:25 to 25:75 and most preferably from about 65:35 to 35:65.

The resulting final latex compositions may be used as binders for architectural coatings, industrial and automotive coatings, sealants, adhesives, paper coating compositions, inks, varnishes and the like.

An economical use of the latex polymers of the present invention includes the use of these polymers in blends with conventional latexes to enhance the properties of the conventional latex. Examples of suitable latex compositions in which the polymers of the present invention may be blended include, for example, those based on resins or binders of acrylonitrile, copolymers of acrylonitrile wherein the comonomer is a diene like isoprene, butadiene or chloroprene, homopolymers of styrene, homopolymers and copolymers of vinyl halide resins such as vinyl chloride, vinylidene chloride or vinyl esters such as vinyl acetate, vinyl acetate homopolymers and copolymers, copolymers of styrene and unsaturated acid anydrides like maleic anhydrides, homopolymers and copolymers of acrylic and methacrylic acid and their esters and derivatives, polybutadiene, polyisoprene, butyl rubber, natural rubber, ethylene-propylene copolymers, olefins resins like polyethylene and polypropylene, polyvinyl alcohol, carboxylated natural and synthetic latexes, epoxies, epoxy esters and other similar polymeric latex materials. The ratio for blending the polymers of the present invention with conventional latexes covers a wide range depending on the desired properties of the final latex product and intended uses. For example, the latex polymers of the present invention may be present from about 0.1 to about 99.9 weight percent.

In paint formulations, the second polymer dispersed in the substantially dissolved first polymer may be used, at levels based on the weight of solids, ranging from about 5 percent to about 40 percent of the total weight of the paint formulation. Paint formulations prepared with these unique polymers have been found to exhibit wet adhesion, high gloss and improved block resistance. The paint formulations may, in addition to the polymers of this invention, contain conventional additives such as pigments, fillers, dispersants, wetting agents, coalescents, rheology modifiers, drying retarders, biocides, anti-foaming agents and the like.

The following description is a general description of an emulsion polymerization process for preparing a second polymer polymerized in a substantially dissolved first polymer. In a typical reaction, a mixture of acrylic or methacrylic acids, acrylate or methacrylate esters, a wet adhesion promoter, and other optional ingredients are fed to a reactor where they are emulsion polymerized in the presence of a chain transfer agent and initiator. Typically the polymerization is carried out using a surfactant or emulsifying agent and in aqueous medium. The temperature can vary from about 35° C. to about 90° C. or higher; the preferred temperature is from about 70° C. to about 85° C. The pressure is not critical and is dependent on the nature of monomers being employed, normally gaseous monomers requiring superatmospheric pressures. At the conclusion of the first polymer monomer feed, the reaction is held at reaction temperature until the residual monomer level is less than about 5000 ppm, followed by addition of the desired neutralizing agent until the first polymer is substantially dissolved, evidenced by the presence of a mostly translucent to clear solution. The second polymer monomers, including optional ingredients, are then fed into the substantially dissolved first polymer medium at the temperatures described above. At the end of the second polymer monomer feed, the reactor is held at temperature for about one (1) hour, cooled and the final latex product collected.

GLOSSARY OF TERMS

The following terms have the following meanings as used in the Examples:

| | |
|---|---|
| AA | acrylic acid |
| ALMA | allyl methacrylate |
| AMS | alpha methyl styrene |
| BA | butyl acrylate |
| BMA | butyl methacrylate |
| DMAEMA | N,N-dimethyl-2-aminoethyl methacrylate |
| EA | ethyl acrylate |
| EHA | ethylhexyl acrylate |
| EHMP | 2-ethylhexyl mercapto propionate |
| EUEM | ethylene urea ethyl methacrylate |
| IOMP | iso-octyl mercapto propionate |
| MA | methyl acrylate |
| MAA | methacrylic acid |
| MAEU | methacryamidoethyl ethylene urea |
| MMA | methyl methacrylate |
| PI | propylene imine |
| SEM | 2-sulfoethyl methacrylate |
| STY | styrene |
| t-DDM | tertiary dodecyl mercaptan |
| VA | vinyl acetate |
| VV | vinyl versatate |

EXAMPLES

The examples which follow are intended to further illustrate the invention and should not be interpreted in any manner as limiting the scope of the present invention.

Examples A1–A46

Synthesis of First Polymer

A monomer mixture is prepared by charging 180 grams of methyl methacrylate (Aldrich), 120 grams of methacrylic acid (Aldrich), and 24 grams of 2- ethylhexyl mercapto propionate (Phillips 66) to a one 1-liter graduated monomer feed cylinder. A two liter jacketed resin flask equipped with a four-bladed stainless steel mechanical stirrer, Claisen connecting tube, Friedrichs water condenser, nitrogen sparge and bubble trap, thermometer, and monomer addition inlets is used to charge 542 grams of water, 3 grams of sodium bicarbonate, 9 grams of Pluronic L-61 stabilizer (BASF), and 4.5 grams of Igepal CO-630 stabilizer (Rhone-Poulenc). An initial oxidizer solution, prepared by dissolving 4 grams of sodium persulfate in 30 grams of water, is prepared in a separate container. A delayed oxidizer solution, prepared by dissolving 2 grams of sodium persulfate in 60 grams of water, is also prepared in a separate container. Under nitrogen purge, the reactor is heated to 80° C. by circulating temperature controlled water through the reactor jacket. After the temperature of the reactor charge has reached 80° C., the initial oxidizer solution is added to the reactor. Ten minutes later, the monomer feed mixture and the delayed oxidizer solution are conveyed to the reaction vessel over a two hour period by FMI pumps using ⅛" Teflon tubing with continuous stirring while the reaction temperature is held between 79°–81° C. The reaction is allowed to proceed at 80° C. for an additional hour after completion of the monomer feed. The reaction mixture is then cooled to 65° C., and 0.2 grams each of tert-butyl hydroperoxide (Aldrich) and sodium formaldehyde sulfoxylate (Royce) in 6 grams of water are added to the latex to reduce residual monomer, and the reaction is allowed to proceed for an additional 75 minutes. The resulting product is then cooled and filtered with a 100 mesh nylon cloth. The resulting latex has a pH of 4 and a 35% solids content.

The molecular weight of the sample was determined by gel permeation chromatography using a Waters 150 Gel Permeation Chromatograph employing five Ultrastyragel® Columns (1000Å, 10,000Å, 500Å, 100Å, and 100Å) connected in series, with tetrahydrofuran as the eluent at a flow rate of 0.7 ml/min. and a constant temperature of 35° C. The columns were calibrated with monodisperse (PDI<1.1)poly (styrene) standards, (Supelco), whose molecular weights were determined by the manufacturer. To prepare a sample for chromatography, a small amount of latex was dried in a oven at 140° C., and the resulting film was dissolved in tetrahydrofuran. The molecular weights of first polymers are reported in the tables below.

The other polymerizations described in the Table A below follow substantially the same process described above, although the composition of the monomer mixture, the solids content of the first polymer latex, and the amount and type of surfactant varied.

TABLE A

First Polymer Compositions

| Example | % MAA | % STY | % MMA | % EA | % BA | % Other | EHMP (phm) | IOMP (phm) | Mn/Mw |
|---|---|---|---|---|---|---|---|---|---|
| A1 | 40 | 0 | 60 | 0 | 0 | 0 | 8 | 0 | 2550/5950 |
| A2 | 40 | 20 | 40 | 0 | 0 | 0 | 8 | 0 | 2900/5030 |
| A3 | 40 | 40 | 20 | 0 | 0 | 0 | 8 | 0 | 3260/5500 |
| A4 | 40 | 60 | 0 | 0 | 0 | 0 | 8 | 0 | 3540/5580 |
| A5 | 40 | 40 | 0 | 20 | 0 | 0 | 8 | 0 | 2770/5290 |
| A6 | 40 | 20 | 20 | 20 | 0 | 0 | 8 | 0 | 3050/5800 |
| A7 | 40 | 20 | 20 | 0 | 0 | 20 AMS | 8 | 0 | 2950/4630 |
| A8 | 40 | 0 | 20 | 0 | 0 | 40 AMS | 8 | 0 | 2740/7720 |
| A9 | 40 | 40 | 20 | 0 | 0 | 0 | 8 | 0 | 3260/5500 |

TABLE A-continued

First Polymer Compositions

| Example | % MAA | % STY | % MMA | % EA | % BA | % Other | EHMP (phm) | IOMP (phm) | Mn/Mw |
|---|---|---|---|---|---|---|---|---|---|
| A10 | 40 | 60 | 0 | 0 | 0 | 0 | 8 | 0 | 3540/3580 |
| A11 | 30 | 70 | 0 | 0 | 0 | 0 | 8 | 0 | 3100/4820 |
| A12 | 30 | 0 | 0 | 70 | 0 | 0 | 8 | 0 | 2910/5130 |
| A13 | 30 | 35 | 35 | 0 | 0 | 0 | 8 | 0 | 2260/5410 |
| A14 | 30 | 0 | 35 | 35 | 0 | 0 | 8 | 0 | 3390/5370 |
| A15 | 30 | 11.7 | 11.7 | 46.7 | 0 | 0 | 8 | 0 | 3400/5950 |
| A16 | 20 | 40 | 40 | 0 | 0 | 0 | 8 | 0 | 2000/5850 |
| A17 | 20 | 40 | 0 | 40 | 0 | 0 | 8 | 0 | 2430/4150 |
| A18 | 20 | 10 | 15 | 55 | 0 | 0 | 8 | 0 | 1810/3410 |
| A19 | 20 | 0 | 20 | 60 | 0 | 0 | 8 | 0 | — |
| A20 | 20 | 25 | 20 | 35 | 0 | 0 | 8 | 0 | — |
| A21 | 20 | 0 | 60 | 20 | 0 | 0 | 0 | 0 | 41310/98170 |
| A22 | 20 | 0 | 60 | 20 | 0 | 0 | 2 | 0 | 3752/7530 |
| A23 | 20 | 0 | 60 | 20 | 0 | 0 | 4 | 0 | 2350/4230 |
| A24 | 20 | 0 | 60 | 20 | 0 | 0 | 8 | 0 | 1480/2210 |
| A25 | 20 | 0 | 80 | 0 | 0 | 0 | 4 | 0 | 3570/6700 |
| A26 | 20 | 0 | 0 | 80 | 0 | 0 | 4 | 0 | 3440/5840 |
| A27 | 40 | 0 | 60 | 0 | 0 | 0 | 4 | 0 | 2780/4480 |
| A28 | 40 | 0 | 0 | 60 | 0 | 0 | 4 | 0 | 3720/6970 |
| A29 | 25 | 0 | 17.5 | 57.5 | 0 | 0 | 4 | 0 | 3510/6770 |
| A30 | 30 | 0 | 35 | 35 | 0 | 0 | 4 | 0 | 3380/5940 |
| A31 | 25 | 0 | 57.5 | 17.5 | 0 | 0 | 4 | 0 | |
| A32 | 30 | 0 | 35 | 35 | 0 | 0 | 2 | 0 | |
| A33 | 30 | 0 | 35 | 35 | 0 | 0 | 0 | 8 | — |
| A34 | 30 | 0 | 35 | 0 | 35 | 0 | 0 | 8 | — |
| A35 | 30 | 0 | 34 | 0 | 34 | 2 EUEM | 0 | 8 | — |
| A36 | 30 | 0 | 34 | 34 | 0 | 2 EUEM | 0 | 8 | — |
| A37 | 30 | 0 | 39 | 33 | 0 | 4 EUEM | 0 | 6 | — |
| A38 | 30 | 0 | 41 | 25 | 0 | 4 EUEM | 0 | 6 | — |
| A39 | 40 | 0 | 0 | 0 | 0 | 60 BMA | 4 | 0 | — |
| A40 | 0 | 0 | 0 | 90 | 0 | 10 AA | 0 | 8 | — |
| A41 | 0 | 0 | 0 | 85 | 0 | 15 AA | 0 | 8 | |
| A42 | 0 | 0 | 0 | 80 | 0 | 20 AA | 0 | 8 | — |
| A43 | 15 | 0 | 0 | 85 | 0 | 0 | 8 | 0 | — |
| A44 | 15 | 0 | 0 | 0 | 0 | 85 MA | 8 | 0 | — |
| A45 | 15 | 0 | 0 | 42.50 | 0 | 42.5 MA | 8 | 0 | — |
| A46 | 30 | 0 | 0 | 35.00 | 0 | 35 MA | 8 | 0 | |

Examples B1–B58

Synthesis of a Second Polymer in the Substantially Dissolved First Polymer

A monomer mixture is prepared by charging 210 grams of styrene and 257 grams of 2-ethylhexyl acrylate to a one 1-liter graduated monomer feed cylinder. A two liter jacketed resin flask equipped with a four-bladed stainless steel mechanical stirrer, Claisen connecting tube, Friedrichs water condenser, nitrogen sparge and bubble trap, thermometer, and monomer addition inlets is used to charge 300 grams of water, optionally, 27 grams of Pluronic L-61 stabilizer (BASF), 380 grams of the latex made in Example A1, and 30 grams of 14% ammonium hydroxide. The turbidity of the reactor charge changed from cloudy to clear on the addition of the ammonium hydroxide, indicating substantial dissolution of the latex of Example A1. An initial oxidizer solution is prepared by dissolving 4 grams of ammonium persulfate in 30 grams of water in a separate container. A delayed oxidizer solution is also prepared by dissolving 2 grams of ammonium persulfate in 60 grams of water in a separate container. Under nitrogen purge, the reactor containing the neutralized alkali-soluble monomer of Example A1 is heated to 80° C. by circulating temperature controlled water through the reactor jacket. After the temperature of the reactor charge has reached 80° C., the initial oxidizer solution is added to the reactor. Two minutes later, the monomer feed mixture is conveyed to the reaction vessel over a two hour period at 1.75 grams/minute for the first 10 minutes and at 3.65 grams/minute for 110 minutes by a FMI pump via ⅛" Teflon tubing while the reaction mixture was continuously stirred at a reaction temperature held between 79°–81° C. The delayed oxidizer is then conveyed to the reaction vessel at 0.3 grams/minute for a 100 minute period starting 20 minutes after the onset of monomer feed. The reaction is allowed to proceed at 80° C. for an additional hour after completion of the monomer feed. The reaction mixture is then cooled to 65° C., and 0.7 grams each of tert-butyl hydroperoxide (Aldrich) and sodium formaldehyde sulfoxylate (Royce) in 6 grams of water are added to the latex to reduce residual monomer. The resulting product is then cooled and filtered with a 250 mesh screen. The resulting 45% solids content latex has a pH of 8, a density of 8.69 lbs./gallon, a Brookfield Viscosity of 100 CPS measured at 6 RPM with a number 2 sized spindle, and a volume average particle diameter of 63 nm as measured with an Microtrac particle size analyzer (Leeds-Northrop).

The other polymerizations described in the Table B below follow substantially the same process described above, although the composition of the monomer mixture varied.

TABLE B

Second Polymer Compositions

| Example | 1st Polymer | phr 1st Polymer | % Styrene | % EHA | % BA | % MMA | % Other | Latex Solids | Viscosity | Particle Size (nm) |
|---|---|---|---|---|---|---|---|---|---|---|
| B1 | A1 | 22 | 45 | 55 | 0 | 0 | 0 | 45.44 | 100 | 63 |
| B2 | A2 | 22 | 45 | 55 | 0 | 0 | 0 | 44.12 | 800 | 84 |
| B3 | A3 | 22 | 45 | 55 | 0 | 0 | 0 | 44.70 | 4500 | 139 |
| B4 | A4 | 22 | 45 | 55 | 0 | 0 | 0 | 41.34 | 500 | 110 |
| B5 | A5 | 22 | 45 | 55 | 0 | 0 | 0 | 47.48 | 1350 | 238 |
| B6 | A9 | 22 | 45 | 55 | 0 | 0 | 0 | 49.83 | 35500 | 150 |
| B7 | A10 | 22 | 45 | 55 | 0 | 0 | 0 | 54.43 | >200000 | 266 |
| B8 | A12 | 22 | 45 | 55 | 0 | 0 | 0 | 51.78 | 1196 | 121 |
| B9 | A13 | 24 | 70 | 30 | 0 | 0 | 0 | 49.24 | >200000 | 131 |
| B10 | A14 | 22 | 45 | 55 | 0 | 0 | 0 | 51.32 | 13,300 | 79 |
| B11 | A15 | 22 | 45 | 55 | 0 | 0 | 0 | 50.30 | 6,320 | 107 |
| B12 | A16 | 22 | 45 | 55 | 0 | 0 | 0 | 50.27 | 10400 | 147 |
| B13 | A17 | 22 | 45 | 55 | 0 | 0 | 0 | 50.47 | 166 | 210 |
| B14 | A19 | 22 | 45 | 55 | 0 | 0 | 0 | 50.60 | 150 | 183 |
| B15 | A16 | 22 | 70 | 0 | 30 | 0 | 0 | 47.92 | 1646 | 85 |
| B16 | A18 | 22 | 70 | 0 | 30 | 0 | 0 | 48.26 | 538 | 139 |
| B17 | A23 | 25 | 45 | 55 | 0 | 0 | 0 | 50.04 | 6940 | 92 |
| B18 | A24 | 25 | 45 | 55 | 0 | 0 | 0 | 50.84 | 1080 | 107 |
| B19 | A23 | 35 | 45 | 55 | 0 | 0 | 0 | 49.20 | 33500 | 102 |
| B20 | A22 | 35 | 70 | 0 | 30 | 0 | 0 | 51.94 | 100000 | 190 |
| B21 | A24 | 35 | 70 | 0 | 30 | 0 | 0 | 50.08 | 2880 | 157 |
| B22 | A23 | 25 | 70 | 0 | 30 | 0 | 0 | 60.64 | 97400 | 91 |
| B23 | A24 | 25 | 70 | 0 | 30 | 0 | 0 | 49.76 | 500 | 102 |
| B24 | A19 | 22 | 45 | 55 | 0 | 0 | 0 | 50.60 | 150 | 183 |
| B25 | A23 | 35 | 45 | 55 | 0 | 0 | 0 | 49.20 | 33500 | 102 |
| B26 | A20 | 22 | 70 | 0 | 30 | 0 | 0 | 48.90 | 31900 | 95 |
| B27 | A27/A25 | 15/15 | 0 | 0 | 30 | 70 | 0 | 55.70 | 9500 | 175 |
| B28 | A33 | 25 | 60 | 0 | 40 | 0 | 0 | 49.81 | 750 | 93 |
| B29 | A33 | 15 | 60 | 0 | 40 | 0 | 0 | 50.09 | 2560 | 65 |
| B30 | A33 | 35 | 0 | 0 | 40 | 60 | 0 | 49.72 | 440 | 170 |

Examples C1–C17

High Gloss Paint Performance of Latex Polymers of the Present Invention

A pigment grind is prepared by mixing the following ingredients in sequence: 195 grams of Butyl Cellosolve® solvent (Union Carbide Corp.), 100 grams of water, 48 grams of Tamol 731 dispersant (Rohm and Haas), 12 grams of Triton® CF-10 surfactant (Union Carbide Corp.), 12.5 grams of BYK 023 dispersant (BYK-Chemie), 1200 grams of TiPure R-900 titanium dioxide pigment (DuPont), 5.5 grams of Natrosol Plus 330 grade cellulose thickener (Aqualon), 25 grams of water, and 7 grams of Nuosept 145 preservative (Huls). The mixture is ground on a high speed disperser for 20 minutes to provide a fineness of grind of less than 1 Hegman.

A high gloss paint is prepared by mixing, under moderate agitation, the following ingredients in order: 160 grams of a latex from Table B as identified in Table C, 80 grams of the pigment grind made above, 3 grams of Butyl Carbitol solvent (Union Carbide Corp.), 8 grams of Solvent 140 mineral spirits (Shell), and 4 grams of LE-410 emulsion (OSI specialties).

The paints are then characterized by 0.3 RPM Brookfield Viscosity (ASTM D2196), Stormer Viscosity (ASTM D562-81), and ICI Viscosity (ASTM D4287) after aging 24 hours to reach viscosity equilibrium. Wet paint films of 0.003 inch thickness are cast using a bird bar on Leneta 3B chart, and allowed to dry at ambient conditions for 1 day and 7 days. Gloss measurements at 20 and 60 degree angle were measured for films cured 1 and 7 days. Twenty four hour face-to-face block resistance of point films cured 1 and 7 days (ASTM D-4946) were rated on a scale from 0 to 10, where 0 represents complete seal, and 10 represents perfect performance with no tack between films.

TABLE C

High Gloss Paint Performance of Latex Polymers of the Present Invention

| Example | Latex | Stormer (KU) | LSV (P) | ICI (P) | 60/20 Gloss | Block 1D/7D | Wet Adhesion |
|---|---|---|---|---|---|---|---|
| C1 | B1 | 109 | 24200 | 1.50 | 9/2 | 6/8 | — |
| C2 | B3 | 70 | 1540 | 1.50 | 85/54 | 5/8 | — |
| C3 | B5 | 67 | 2375 | 1.40 | 90/72 | 5/8 | — |
| C4 | B6 | 91 | 228 | 4.30 | 92/60 | 0.4 | — |
| C5 | B7 | 121 | 624 | >5 | 94/56 | 0/0 | — |
| C6 | B10 | 78 | 252 | 1.60 | 89/66 | 0/0 | — |
| C7 | B111 | 85 | 436 | 2.20 | 89/67 | 0/0 | — |
| C8 | B13 | 73 | 387 | 1.40 | 90/58 | 4/0 | — |
| C9 | B14 | 65 | 122 | 1.40 | 90/75 | 0/— | — |
| C10 | B20 | 117 | 197 | 4.40 | 82/48 | 10/— | — |
| C11 | B26 | 100 | 245 | 2.90 | 68/19 | 6/— | — |
| C12 | B30 | 61 | 18 | 1.20 | 50/10 | 10/— | — |
| C13 | B31 | 69 | 14 | 1.20 | 70/24 | 10/— | 0 |
| C14 | B32 | 73 | 22 | 2.40 | 70/30 | 10/— | 0 |
| C15 | B33 | 70 | 23 | 0.90 | 70/27 | 9/— | 0 |
| C16 | B34 | 67 | 12 | 1.20 | 70/27 | 9/— | 0 |
| C17 | B35 | 64 | 12 | 0.90 | 59/13 | 10/— | — |

The above table shows improved rheological properties obtained when using the latex polymers of the present invention. Paints formulated from these resins show improvements in ICI viscosity, gloss and block resistance, simultaneously, without the addition of conventional thickeners. In addition, Examples C13 –C17 (based on A36 first polymer containing wet adhesion promoter) confirm that the desired improvement in wet adhesion properties is not obtained by merely incorporating a wet adhesion promoter into the latex, without balancing the acid level of the latex composition.

Examples D1–D14

Semi-Gloss Paint #1—Performance of Latex Polymers of the Present Invention

A pigment grind is prepared by mixing the following ingredients in sequence: 203 grams of water, 1.7 grams of Kathon LX perservative (Rohm and Haas), 2 grams of Cellosize QP-4400 hydroxy ethyl cellulose (Union Carbide Corp.), 6 grams of Tamol 731 dispersant (Rohm and Haas), 2 grams of Triton® NP-10 surfactant (Union Carbide Corp.), 1 gram of Colloid 640 defoarmer (Rhone-Poulenc), and 250 grams of Tiona RCL-6 titanium dioxide pigment (SCM Corporation). The mixture is ground on a high speed disperser for 20 minutes to provide a fineness of grind of less than 1 Hegman.

A semi-gloss paint is made by fixing under moderate agitation the following ingredients in order: 522 grams of a latex from Table B identified in Table D, 465 grams of the pigment grind made above, 17.8 grams of Butyl Carbitol solvent (Union Carbide Corp.), 2 grams of Colloid 640 defoamer (Rhone-Poulenc), and 3 grams of 28% ammonium hydroxide solution.

The paints are then characterized by 0.3 RPM Brookfield Viscosity (ASTM D2196), Stormer Viscosity (ASTM D562-81), and ICI Viscosity (ASTM D4287) after aging 24 hours to reach viscosity equilibrium. Wet paint films of 0.003 inch thickness are cast using a bird bar on Leneta 3B chart, and allowed to dry at ambient conditions for 1 day and 7 days. Gloss measurements at 20 and 60 degree angle were measured for films cured 1 and 7 days. Twenty four hour face-to-face block resistance of paint films cured 1 and 7 days (ASTM D-4946) were rated on a scale from 0 to 10, where 0 represents complete seal, and 10 represents perfect performance with no tack between films.

TABLE D

Gloss Paint #1 Performance of Latex Polymers

| Example | Latex | Stormer (KU) | LSV (P) | ICI (P) | 60/20 Gloss | Block 1/7 |
|---|---|---|---|---|---|---|
| D1 | B45 | 75 | 56 | 0.40 | 11/2 | 10/10 |
| D2 | B46 | 86 | 584 | 0.90 | 52/12 | 8/10 |
| D3 | B47 | 75 | 460 | 0.80 | 46/9 | 8/10 |
| D4 | B48 | 93 | 1460 | 0.90 | 55/16 | 2/10 |
| D5 | B49 | 83 | 612 | 0.80 | 52/12 | 1/10 |
| D6 | B50 | 83 | 684 | 0.80 | 51/13 | 3/10 |
| D7 | B51 | 88 | 428 | 0.80 | 36/5 | 6/10 |
| D8 | B52 | 83 | 60 | 0.40 | 14/2 | 10/10 |
| D9 | B53 | 83 | 684 | 0.80 | 51/13 | 3/10 |
| D10 | B54 | 116 | 1680 | 3.10 | 63/22 | 3/10 |
| D11 | B55 | 73 | 648 | 0.40 | 28/4 | 1/10 |
| D12 | B56 | 68 | 116 | 0.70 | 32/6 | 3/10 |
| D13 | B57 | 70 | 128 | 0.60 | 20/3 | 8/10 |
| D14 | B58 | 70 | 120 | 0.90 | 26/4 | 4/10 |

The above table shows significant improvements in block resistance, along with desirable Brookfield viscosity, Stormer viscosity and ICI viscosity when using the latex polymers of the present invention.

Examples E1–E10

Semi-Gloss Paint #2—Performance of Latex Polymers of the Present Invention

A pigment grind is prepared by mixing the following ingredients in sequence: 302 grams of water, 4.2 grams of Bevaloid 681F anti-foam, 5.5 grams of Tergitol NP-10 surfactant, 5.5 grams of Tergitol NP-40 surfactant (70% solution), 192 grams of propylene glycol, 8.6 grams of Cellosize QP-15000 hydroxy ethyl cellulose (Union Carbide Corp.), 11 grams of UCAR R-40N dispersant (Union Carbide Corp.), 24.5 grams of Filmer IBT coalescent (Union Carbide Corp.), 638 grams of TiPure R-900 titanium dioxide pigment (DuPont), 1.2 grams of Nuosept 95 preservative (Huls), and 7 grams of ammonia. The mixture is ground on a high speed disperser for 20 minutes to provide a fineness of grind of less than 1 Hegman.

A semi-gloss paint is made by mixing under moderate agitation the following ingredients in order: 55 grams of a latex from Table B as identified in Table E, and 45 grams of the pigment grim made above. The paints were then characterized by using the methods described above in Example C and the results are shown below in Table E.

TABLE E

Semi-Gloss Paint Performance of Latex Polymers

| Example | Latex | LSV (P) | ICI (P) | 60/20 Gloss |
|---|---|---|---|---|
| E1 | B35 | 900 | 1.40 | 68/25 |
| E2 | B36 | 2000 | 0.00 | 70/26 |
| E3 | B37 | 600 | 1.40 | 67/31 |
| E4 | B38 | 400 | 1.80 | 77/47 |
| E5 | B39 | 500 | 1.20 | 74/41 |
| E6 | B40 | 900 | 2.30 | 80/45 |
| E7 | B41 | 400 | 1.80 | 74/37 |
| E8 | B42 | 1300 | 2.80 | 58/17 |
| E9 | B43 | 900 | 1.50 | 73/32 |
| E10 | B44 | 1300 | 1.10 | 63/19 |

Results in the above table show performance of the latex polymers of the present invention to yield a desirable ICI viscosity and acceptable gloss performance.

Examples F1–F6

Post-Reaction of Latex Polymers With Propylene Imine

A 2 liter resin kettle equipped as described in Example A1, is charged with 1020 grams of latex B1. The latex is heated to and held at 80 degrees Celsius under moderate agitation. A propylene amine solution containing 39.2 grams of a 20% solution in water is added drop-wise to the latex over a fifteen minute period. The mixture is allowed to react another 20 minutes before cooling to ambient temperature. Gas chromatography showed less than 1 ppm residual propylene imine.

The latexes were then evaluated in the paint formula of Example C, and the resulting paints were characterized in the same manner as described above and the results are shown below in Table F. Table F also shows the results for using this process on other latexes described in Table B.

TABLE F

Performance of Latex Polymers Post-Reacted With PI

| Ex | Latex | PI (phr) | Stormer (KU) | LSV(P) | ICI(P) | 60/20 Gloss | Block 1/7 |
|---|---|---|---|---|---|---|---|
| F1 | B1 | 1.80 | 67 | 60 | 1.20 | 36/7 | 3/7 |
| F2 | B2 | 1.80 | 65 | 24 | 1.40 | 25/5 | 3/8 |
| F3 | B3 | 1.80 | 78 | 64 | 2.60 | 73/30 | 1/4 |
| F4 | B4 | 1.80 | 141 | 1752 | 1.70 | 64/16 | 4/7 |
| F5 | B8 | 1.80 | 78 | 104 | 1.40 | 87/67 | –/1 |
| F6 | B9 | 0.90 | 106 | 124 | 3.30 | 78/38 | 5/9 |

Although not known to react in an alkaline environment, the above results show propylene imine not only substantially dissolves or neutralizes the latex, but also reacts with the latex to provide improvements in block resistance and other rheological properties.

Example G1–G4

Neutralization of First Polymers Using Various Neutralizing Agents

Latex polymer are made using the process of Example B, except that the neutralizing agent is replaced with the neutralizing agent indicated in Table H below. These examples further demonstrate that propylene imine may act as a neutralizing agent in addition to providing wet adhesion properties to the final latex.

The first polymer composition is Example A39 of Table A, and the second polymer monomer composition consists of 50% butyl acrylate and 50% methyl methacrylate. The first polymer comprises 25 parts per hundred resin (phr) of the total resin. The amount of neutralizing agent used is expressed in terms of the theoretical amount of base required to neutralize 100% of the carboxyl groups in the first polymer, thereby substantially dissolving the first polymer.

The latexes are then evaluated in the paint formula of Example C, and the resulting paints were characterized in the same manner described above.

In addition, "wet adhesion" of the paints to gloss alkyd are evaluated in the following manner: Gloss alkyd panels are prepared by casting a 0.007 inch thick film of Glid-guard 4554 gloss alkyd paint (Glidden) on a leneta scrub panel. The panels are cured for 3 weeks.

A 0.007 inch thick film of a paint containing a latex indicated in Table G below is cast on top of the cured gloss alkyd film. This film is dried for 24 hours, and then cross-hatched into a 10 by 10 grid of 3 mm squares, using a razor. The panel is then soaked in water at ambient conditions for 30 minutes, and scrubbed on a scrub machine in a media of 5% slurry of "LAVA" brand soap. The number of cycles required to completely remove the test paint film are recorded in Table H.

feeds influences the randomness by which the carboxylic acid monomer copolymerizes with other monomers, which in turn influences solubilization or dissolution of the first polymer. This solubilization or substantial dissolution is noted in the following examples by whether the polymer solution becomes translucent or mostly clear on neutralization.

The polymers described in Table H below are prepared by the process used in Example A1, except that the location of the carboxylic monomer and chain transfer agent have been split between the monomer feed (MF) and the initial reactor charge (RC). The monomer ratios given in Table H are percentages based on the total amount of monomer. Table H presents the clarity of the latexes after neutralization with ammonium hydroxide. In Table H, O=opaque, T=translucent, and C=clear.

TABLE H

First Polymer Compositions Using Split Feeds

| Ex. | % MAA MF/RC | % AA MF/RC | % Styrene | SEM phm | EHMP phm MF/RC | Mn Mn | Optical Clarity |
|---|---|---|---|---|---|---|---|
| H1 | 45/5 | 0/0 | 50 | 0 | 8/0 | 2300 | O |
| H2 | 30/0 | 0/0 | 70 | 0 | 8/0 | 3070 | O |
| H3 | 25/5 | 0/0 | 70 | 0 | 810 | 2870 | O |
| H4 | 0/0 | 27/6 | 67 | 0 | 7.6/0.4 | 2690 | T |
| H5 | 13.5/0 | 13.5/6 | 67 | 0 | 7.6/0.4 | 2560 | C |
| H6 | 7/0 | 7/6 | 80 | 0 | 7.6/0.4 | 2700 | T |
| H7 | 9.5/0 | 9.5/6 | 75 | 0 | 7.6/0.4 | 2600 | T |
| H8 | 9.5/0 | 9.5/6 | 75 | 2 | 7.610.4 | 2350 | C |

As shown above, staging of the monomer feed so that excess acid monomer is present just at initiation of the polymerization favors random polymerization of the carboxyl monomer and styrene monomer; thus making it possible to substantially dissolve a polymer that contains much less acid and much more styrene than would be expected.

TABLE G

| | | | Neutralizing Agents | | | | | | |
|---|---|---|---|---|---|---|---|---|---|
| Ex. | Neutralizing Agent | Theo. Degree of Neutralization (%) | Latex Solids (%) | Viscosity (CPS) | Particle Size (nm) | Stormer (KU) | LSV (P) | ICI (P) | 60/20 Gloss | Adh. (cycles) |
| G1 | NH₄OH | 100 | 43.97 | >100,000 | 168 | 102 | 1020 | 3.2 | 72/24 | 1 |
| G2 | PI/NH₄OH | 70/30 | 39.41 | 215 | 350 | 99 | 600 | 3.1 | 6/2 | 28 |
| G3 | KOH | 100 | 43.48 | >100,000 | 243 | 110 | 1540 | 2.2 | 50/6 | 1 |
| G4 | PI/KOH | 70/30 | 42.60 | 19,400 | 359 | 97 | 160 | 1.6 | 35/5 | 350 |

From the above table it can be seen that propylene imine acts as both a neutralizing agent for the first polymer, and also attributes wet adhesion properties to a first polymer composition prepared without addition of a wet adhesion promoter.

Examples H1–H8

First Polymer Compositions Prepared Using Split Monomer and Chain Transfer Agent Feeds The monomer feeds used in the production of the first polymer need not be homogeneous. Splitting the monomer

Examples I1–I5

Vinyl Acrylic Latex Polymers

These examples show the use of the process of the present invention to produce small particle sized vinyl acrylic compositions having improved mechanical stability.

A monomer mixture is prepared by charging 320 grams of vinyl acetate, 40 grams of butyl acrylate, and 40 grams of Vinyl Versatate (Shell) to a one 1-liter graduated monomer feed cylinder. A two liter jacketed resin flask equipped as described in Example A is charged with 94 grams of water, 343 grams of the latex made in Example A30, 98 grams of 14% sodium hydroxide solution, 1.7 grams of a 23% aqueous solution of Rhodacal DS-4 stabilizer (Rhone-Poulenc), 4.6 grams of Tergitol NP-15 stabilizer (Union Carbide), 6.6 grams of a 70% aqueous solution of Tergitol NP-40 stabilizer (Union Carbide), 1.6 grams of a 25% aqueous solution of sodium vinyl sulfate (SVS), and 31.2 grams of the monomer mixture made above. The turbidity of the reactor charge changed from opaque to mostly clear on addition of sodium hydroxide, indicating dissolution of the latex. An initial oxidizer solution is prepared by dissolving 0.2 grams of ammonium persulfate in 20 grams of water in a separate container. An initial reducer solution is prepared by dissolving 0.2 grams of sodium metabisulfite in 20 grams of water in a separate container. A delayed oxidizer solution is prepared by dissolving 0.4 grams of ammonium persulfate in 40 grams of water in a separate container. A delayed reducer solution is prepared by dissolving 0.2 grams of sodium metabisulfite in 40 grams of water in a separate container.

Under nitrogen purge, the reactor is heated to 65° C. by circulating temperature controlled water through the reactor jacket. After the temperature of the reactor charge has reached 65° C., the initial oxidizer and reducer solutions are added to the reactor. When the exotherm reaches its peak temperature, the monomer feed beginning at a feed rate such that the remaining monomer mixture is conveyed to the reaction vessel over a three hour period. The reaction mixture is continuously stirred at a reaction temperature held between 70°–72° C. Starting simultaneously with the monomer feed, the delayed oxidizer and reducer solutions are conveyed to the reaction vessel over a three hour period. The reaction is allowed to proceed at 70° C. for another half of an hour after the completion of monomer feed, after solutions of tert-butyl hydroperoxide (0.17 grams in 10 grams of water) and sodium formaldehyde sulfoxylate (0.6 grams in 10 grams of water) are fed into the latex over a 1 hour period to reduce residual monomer. The product latex is then cooled and filtered with a 250 mesh screen. The resulting 45% solids content latex, denoted J2 in Table I below, has a pH of 6, a density of 9.00 lbs./gallon, a Brookfield Viscosity of 67 cps measured at 6 rpm with a number 2 sized spindle, and a volume average particle diameter of 211 nm as measured with an Microtrac particle size analyzer (Leeds-Northrop).

The mechanical stability of the latex was determined by the following method. The latex is filtered through a 250 mesh screen and 250 grams of the filtered latex sheared in a Waring® blender at it highest speed setting for 10 minutes, followed by a second filtering through a 250 mesh screen. The coagulum collected on the 250 mesh screen was dried in an oven at 140° C. The amount of coagulum, expressed in parts per million of latex, is recorded in Table I.

The other polymerizations described in Table I below follow substantially the same process described above, with the following exceptions. In Example I1, the first polymer is omitted. In Example I3 and I6–I10, the stabilizers (i.e., Rhodacal DS-4, NP-15, NP-40, SVS) are omitted. In Examples I6 and I7, 2 grams of sodium acetate buffer are added to the reactor charges, and an amount of acetic acid is added to adjust the pH of the reactor charge to 6.7.

TABLE I

Vinyl Acrylic Latex Polymers

| Ex. | First Stage | phr First Stage | % VA | % VV | % BA | % Other | Latex Solids (%) | Part. Size (nm) | Mech. Stability (ppm seeds) |
|---|---|---|---|---|---|---|---|---|---|
| I1 control | None | 0 | 80 | 10 | 10 | 0 | 50.04 | 1122 | 100% Fail |
| I2 | A30 | 9 | 80 | 10 | 10 | 0 | 50.14 | 323 | 14 |
| I3 | A30 | 23 | 80 | 10 | 10 | 0 | 45.03 | 211 | <1 |
| I4 | A30 | 23 | 80 | 10 | 10 | 0 | 42.48 | 107 | 3 |
| I5 | A30 | 30 | 80 | 10 | 10 | 0 | 43.36 | 178 | 2 |
| I6 | A40 | 23 | 80 | 10 | 10 | 0 | 40.03 | 231 | 9 |
| I7 | A30 | 23 | 80 | 10 | 10 | 0 | 44.07 | 249 | 13 |
| I8 | A41 | 23 | 80 | 10 | 10 | 0 | 47.89 | 245 | 5 |
| I9 | A42 | 23 | 80 | 10 | 10 | 0 | 48.01 | 284 | 2 |
| I10 | A46 | 23 | 0 | 60 | 30 | 10 MMA | 48.17 | 92 | 5 |

In Example I1, no first polymer is used to demonstrate that without the first polymer of the present invention, the latex lacks mechanical stability (complete failure). However, in the presence of the first polymer, a small particle size is generated, and the latexes are mechanically stable, with only trace amounts of grit formed. Without the use of conventional surfactants (I3 and I6–I10), the first polymer of the present invention is shown to both emulsify and stabilize the resulting latex.

Examples J1–J28

Alternate Process for Preparing Latex Polymer Compositions of the Present Invention An initial monomer mixture is prepared by charging 142.7 grams of methyl methacrylate (Aldrich), 61.3 grams of butyl acrylate (Aldrich), 86.6 grams of methacrylic acid (Aldrich), 17.1 grams of methacrylamidoethyl ethylene urea (Rhone-Poulenc), 12.0 grams of 2-ethylhexyl mercaptopropionate (Phillips 66), and 13.3 grams of Aerosol OT surfactant (75% in water from Cytek) to a one liter flask. A two liter jacketed resin flask equipped with a four-bladed stainless steel mechanical stirrer, Claisen connecting tube, Friedrichs water condenser, nitrogen sparge and bubble trap, thermometer, and monomer and initiator addition inlets is used to charge 618.1 grams of water and 2.7 grams of Aerosol OT. An initial oxidizer solution is prepared in a separate container by dissolving 3.9 grams of ammonium persulfate in 17.4 grams of water. A delayed oxidizer solution is also prepared in a separate container by dissolving 4.1 grams of ammonium persulfate in 100 grams of water. The reactor flask is purged with nitrogen and heated to 82° C., at which point the oxidizer solution is added. The initial monomer mixture is added gradually over a one hour period by FMI pumps using ⅛" Teflon tubing with continuous stirring, while the reaction temperature is held between 82° C. and 85° C.

In the meantime, a second monomer mixture is prepared by adding 347.6 grams of methyl methacrylate and 231.8 grams of butyl acrylate to a flask. A neutralizer solution is also prepared by mixing 73.1 grams of ammonium hydroxide (28% ammonia in water) with 111.7 grams of water.

When the initial monomer mixture is completely added to the reaction flask, the monomer addition lines are immediately rinsed with 12.7 grams of water, and the rinse water pumped into the reactor. The pH of the mixture is less than 3.0. After 15 minutes, an aliquot is removed and is shown to have a volume average particle size (Mv) of 80 nm (as measured using a Microtrac Series 9200 Ultrafine Particle Analyzer). The neutralizer solution is then added to the reactor, and the reaction mixture changes in appearance from an opaque latex to a translucent solution indicating substantial dissolution of the latex. The pH of the neutralized mixture is 9.9. An aliquot is removed but no measurable particles are detected.

Fifteen minutes after the neutralizer is added, the second monomer mixture and the delayed oxidizer solution are gradually added over approximately 150 minutes, while maintaining the reaction temperature between 82° C. and 85° C. After completion of the second addition, the reaction is held an additional 45 minutes and then cooled to room temperature. The resulting latex product is filtered through a 100 mesh screen into a storage vessel. The latex has a pH of 9.8, volume average particle size (Mv) of 190 nm, area average particle size (Ma) of 150 nm, density of 8.9 lbs./gal. and total solids of 49.8%. The latex viscosity is 29,000 cps.

The other polymerizations described in Table J below follow substantially the same process as described above, although the composition of the monomer mixtures, solids content of the latex and the amount and type of surfactant used varied.

All of the above examples were evaluated in paint formulations using paints made by the following process. A pigment grind is prepared by mixing in sequence: 260 grams of water, 140 grams of propylene glycol, 4 grams of Foammaster VF defoamer (Diamond Shamrock), 7.2 grams of Kathon LX preservative (Rohm & Haas), 52 grams of Tamol 731 dispersant (Rohm & Haas), 4 grams of Triton CF-10 dispersant (Union Carbide), and 1304 grams of TiPure R-900 titanium dioxide pigment (DuPont). The mixture is ground on a high speed disperser for 20 minutes to provide a Hegman value less than 1 micron.

A semi-gloss paint is prepared using the above pigment grind and the experimental latexes descripted in Table J. The appropriate amounts of latex and grind are used to give a paint having a pigment volume concentration (PVC) of 22% and a total volume solids of 35%. Coalescent solvents include UCAR® Filmer IBT (4.5% latex solids from Union Carbide) and Butyl CARBITOL® (9.0% latex solids from Union Carbide). UCAR® Polyphobe 102 thickener (Union Carbide) is also added at the appropriate level to bring the Stormer Viscosity to about 90 KU.

The paints are evaluated for wet adhesion using the process described in Example G. Scrub resistance is evaluated by preparing three drawdowns of the test paint and a control paint using a 7 mil Dow bar on Leneta scrub panel, and evaluated according to the procedure described in ASTM D2486.

TABLE J

Alternate; Process - Latex Polymer Compositions.

| | 1st Polymer Composition | | | | | | Theor. % Neutral. | 2nd Poly. | | % 1st Poly. | % 2nd Poly. | Total Solids | Particle Size (nm) | Visc. (cps) | Gloss 60/20 | Wet Adh. | Scrub |
|---|---|---|---|---|---|---|---|---|---|---|---|---|---|---|---|---|---|
| Ex. | BA | MMA | MAA | MAEU | EHMP | Other | | BA | MMA | | | | | | | | |
| J1 | 20.40 | 47.60 | 30 | 2 | 4 | | 115 | 40 | 60 | 35 | 65 | 49.80 | 195 | 29000 | 60/15 | <10 | |
| J2 | 23.50 | 54.50 | 20 | 2 | 8 | | 85 | 40 | 60 | 25 | 75 | 48.80 | 51 | 15900 | 60/15 | <10 | |
| J3 | 27.30 | 40.70 | 30 | 2 | 8 | 0.5 SEM | 115 | 40 | 60 | 35 | 65 | 49.40 | 199 | 700 | 63/17 | <10 | |
| J4 | 31.30 | 46.70 | 20 | 2 | 8 | | 115 | 40 | 60 | 25 | 75 | 49.00 | 112 | 530 | 69/28 | <50 | 950 |
| J5 | 20.40 | 47.60 | 30 | 2 | 8 | 0.5 SEM | 85 | 40 | 60 | 35 | 65 | 49.40 | 151 | 740 | 70/29 | <10 | |
| J6 | 27.30 | 40.70 | 30 | 2 | 4 | | 85 | 40 | 60 | 35 | 65 | 50.30 | 114 | >200000 | 73/33 | <10 | |
| J7 | 31.30 | 46.70 | 20 | 2 | 4 | 0.5 SEM | 85 | 40 | 60 | 25 | 75 | 48.50 | 294 | >200000 | 47/7 | <50 | 638 |
| J8 | 33.30 | 49.70 | 13 | 4 | 8 | | 90 | 39.4 | 60.6 | 25 | 75 | 48.10 | 110 | 426 | | 42 | >2000 |
| J9 | 24.10 | 55.90 | 13 | 7 | 8 | | 90 | 39.4 | 60.6 | 25 | 75 | 49.00 | 110 | 18000 | | 166 | 939 |
| J10 | 32.10 | 47.90 | 13 | 7 | 8 | | 90 | 47.4 | 52.6 | 25 | 75 | 48.90 | 140 | 7600 | | 425 | 1375 |
| J11 | 25.00 | 58.00 | 13 | 4 | 8 | | 90 | 47.4 | 52.6 | 25 | 75 | 48.60 | 80 | 1460 | | 490 | 1422 |
| J12 | 33.10 | 49.40 | 10 | 7.5 | 7 | | 90 | 45.9 | 54.1 | 25 | 75 | 51.00 | 350 | >200000 | | 731 | |
| J13 | 25.60 | 59.40 | 10 | 5 | 7 | | 90 | 45.9 | 54.1 | 25 | 75 | 48.30 | 110 | 750 | | 1630 | >2000 |
| J14 | 26.20 | 60.80 | 9 | 4 | 8 | | 90 | 39.4 | 60.6 | 25 | 75 | 47.70 | 100 | 720 | | 428 | >2000 |
| J15 | 25.30 | 58.70 | 9 | 7 | 8 | | 90 | 47.4 | 52.6 | 25 | 75 | 48.10 | 130 | 1100 | | 1043 | 1520 |
| J16 | 34.90 | 52.10 | 9 | 4 | 8 | | 90 | 47.4 | 52.6 | 25 | 75 | 48.40 | 110 | 200 | | 1885 | 1940 |
| J17 | 33.70 | 50.30 | 9 | 7 | 8 | | 90 | 39.4 | 60.6 | 25 | 75 | 48.70 | 130 | 860 | | >2000 | 1114 |
| J18 | 64.00 | 25.60 | 9 | 1.4 | 7 | | 90 | 45.9 | 54.1 | 25 | 75 | 48.50 | 120 | 78 | | 291 | 947 |

TABLE J-continued

Alternate; Process - Latex Polymer Compositions.

| | 1st Polymer Composition | | | | | Theor. % | 2nd Poly. | | % 1st | % 2nd | Total | Particle Size | Visc. | Gloss | Wet | |
|---|---|---|---|---|---|---|---|---|---|---|---|---|---|---|---|---|
| Ex. | BA | MMA | MAA | MAEU | EHMP | Other | Neutral. | BA | MMA | Poly. | Poly. | Solids | (nm) | (cps) | 60/20 | Adh. | Scrub |
| J19 | 33.40 | 55.60 | 9 | 2 | 7 | | 90 | 45.9 | 54.1 | 25 | 75 | 48.70 | 120 | 80 | | 370 | 865 |
| J20 | 32.30 | 53.80 | 9 | 5 | 7 | | 90 | 45.9 | 54.1 | 25 | 75 | 48.50 | 270 | 21 | | 1386 | 720 |
| J21 | 35.50 | 52.00 | 9 | 3.5 | 7 | | 90 | 45.9 | 54.1 | 25 | 75 | 48.70 | 120 | 60 | | 1572 | 723 |
| J22 | 25.00 | 62.50 | 9 | 3.5 | 7 | | 90 | 45.9 | 54.1 | 25 | 75 | 48.30 | 130 | 55 | >2000 | 515 |
| J23 | 24.40 | 61.00 | 9 | 5.6 | 7 | | 90 | 45.9 | 54.1 | 25 | 75 | 48.20 | 130 | 56 | >2000 | 749 |
| J24 | 14.30 | 71.70 | 9 | 5 | 7 | | 90 | 45.9 | 54.1 | 25 | 75 | 48.30 | 120 | 118 | >2000 | 779 |
| J25 | 14.80 | 74.20 | 9 | 2 | 7 | | 90 | 45.9 | 54.1 | 25 | 75 | 48.50 | 100 | 226 | >2000 | 885 |
| J26 | 9.20 | 78.30 | 9 | 3.5 | 7 | | 90 | 45.9 | 54.1 | 25 | 75 | 48.30 | 120 | 50 | >2000 | 1292 |
| J27 | 14.70 | 73.30 | 9 | 2 | 7 | | 50 | 45.9 | 54.1 | 25 | 75 | 50.30 | 140 | 60 | | 378 | 630 |
| J28 | 14.70 | 73.30 | 9 | 2 | 7 | | 0 | 45.9 | 54.1 | 25 | 75 | 49.40 | 260 | 30 | | 1060 | 434 |

Examples K1–K11
Second Alternative Process for Preparing Latex Polymer Compositions of the Present Invention An initial monomer mixture is prepared by adding 29.5 grams of methyl methacrylate (Aldrich), 250.7 grams of butyl acrylate (Aldrich), 13.3 grams of Aerosol OT surfactant (75% in water from Cytek) to a one liter flask. A two liter jacketed resin flask equipped with a four-bladed stainless steel mechanical stirrer, Claisen connecting tube, Friedrichs water condenser, nitrogen sparge and bubble trap, thermometer, and monomer and initiator addition inlets is used to charge 635 grams of water and 2 grams of Aerosol OT. An initial oxidizer solution is prepared by dissolving 2.2 grams of ammonium persulfate in 17.5 grams of water. A delayed oxidizer solution is prepared by dissolving 4.4 grams of ammonium persulfate in 100 grams of water. The reactor flask is purged with nitrogen and heated to 82° C., at which point the oxidizer solution is added. The initial monomer mixture is added gradually over a approximately 210 minutes by FMI pumps using ⅛" Teflon tubing with continuous stirring, while the reaction temperature is held between 82° C. and 85° C.

In the meantime, a second monomer mixture is prepared by adding 127.7 grams of methyl methacrylate and 24.9 grams of butyl acrylate, 6.8 grams of methacrylamidoethyl ethylene urea, and 11.9 grams of 2-ethylhexyl mercaptopropionate to a flask.

When the initial monomer mixture is completely added to the reaction flask, the monomer addition lines are immediately rinsed with 15 grams of water, and the rinse water pumped into the reactor. The pH of the mixture is 3.2. After 15 minutes, the second monomer mixture is gradually added over 50 minutes. The reaction temperature is maintained at 82° C. and 85° C. for an additional 60 minutes. After completion of the second monomer addition, the reaction is held for an additional 45 minutes and then cooled to room temperature. The resulting latex product is filtered through a 100 mesh screen into a storage vessel. The latex has a pH of 9.8, Mv of 190 nm, Ma of 150 nm, density of 8.9 lbs./gal. and total solids of 49.8%. The latex viscosity is 29,000 cps.

Examples K2–K11 follow substantially the same process as described above, although the composition of the monomer mixtures, solids content and the amount and type of surfactant used vary. In addition, Examples K4 through K11 show incorporation of the wet adhesion monomers in either the first or second polymer monomer mixtures. Evaluations are as described above.

TABLE K

Alternative Continuous Process - Latex Polymers

| | 1st Poly. Composition | | | | | Theor. % | 2nd Poly Composition | | | | |
|---|---|---|---|---|---|---|---|---|---|---|---|
| Ex. | BA | MMA | MAA | MAEU | EHMP | Neutral. | BA | MMA | MAA | MAEU | EHMP |
| K1 | 45.9 | 54.1 | | | | | 13.70 | 68.60 | 9.3 | 1.9 | 6.5 |
| K2 | 45.9 | 54.1 | | | | | 13.90 | 70.10 | 9.4 | | 6.6 |
| K3 | 45.9 | 54.1 | | | | | 12.30 | 62.20 | 18.9 | | 6.6 |
| K4 | 7.6 | 76.4 | 9.4 | | 6.5 | 96 | 48.60 | 48.60 | 0.9 | 2 | |
| K5 | 7.2 | 71.9 | 9.4 | 5 | 6.5 | 96 | 50.00 | 50.00 | | | |
| K6 | 7.6 | 76.4 | 9.4 | | 6.5 | 96 | 54.80 | 43.80 | 0.4 | 1 | |
| K7 | 7.5 | 74.6 | 9.4 | 2 | 6.5 | 96 | 55.60 | 44.40 | | | |
| K8 | 7.4 | 73.6 | 12.5 | | 6.5 | 96 | 54.00 | 43.20 | 0.9 | 2 | |
| K9 | 6.9 | 69.1 | 12.5 | 5 | 6.5 | 96 | 55.60 | 44.40 | | | |
| K10 | 7.4 | 73.6 | 12.5 | | 6.5 | 96 | 49.30 | 49.30 | 0.4 | 1 | |
| K11 | 7.2 | 71.8 | 12.5 | 2 | 6.5 | 96 | 50.00 | 50.00 | | | |

TABLE K-continued

Alternative Continuous Process - Latex Polymers

| Ex. | % 1st Poly. | % 2nd Poly. | Total Solids | Particle Size (nm) | Visc. (cps) | Wet Adh. | Scrub |
|---|---|---|---|---|---|---|---|
| K1 | 75 | 25 | 48.00 | 220 | 30 | 55 | 1379 |
| K2 | 75 | 25 | 47.00 | 130 | 20 | 0 | 1895 |
| K3 | 75 | 25 | 47.00 | 180 | 25 | 0 | 1905 |
| K4 | 25 | 75 | 49.20 | 120 | 145 | >2000 | 1159 |
| K5 | 25 | 75 | 49.10 | 80 | 980 | >2000 | 520 |
| K6 | 25 | 75 | 49.60 | 90 | 56 | >2000 | 583 |
| K7 | 25 | 75 | 49.50 | 70 | 296 | 4 | 537 |
| K8 | 25 | 75 | 49.80 | 90 | | >2000 | 421 |
| K9 | 25 | 75 | 50.10 | 110 | | 500 | 178 |
| K10 | 25 | 75 | 49.80 | 90 | | 15 | 1750 |
| K11 | 25 | 75 | 49.70 | 100 | | 52 | 1048 |

Example L

Measurement of Grafting Between Stages by Gel Permeation Chromatography

GPC fractograms of latex polymer of Examples J1–J7 and J25 show two peaks, one peak for the substantially dissolved, low molecular weight first polymer medium, and one for the higher molecular weight second polymer. The concentrations of each molecular weight species derived from these measurements were virtually identical to those expected from the ratios of first polymer to second polymer stoichiometry, showing virtually no grafting between the two polymers. The latexes also had no gel fraction, providing further evidence against grafting between polymers.

Example M

Use of Isolated First Polymer As a Paint Additive

The first polymer has dispersant properties which allow its use in latex synthesis as shown in the above examples, and also as a paint additive to improve rheological properties, such as block resistance, in paints. The first polymer may be added in the paint let down, or in the pigment grind, or distributed between the two. The examples that follow demonstrate its use in a vinyl acrylic semi-gloss paint. A portion of the vinyl acrylic latex used as the control paint is replaced, on a solids basis, so that the pigment volume concentration remains constant as the ratio of post-added first polymer added to the latex binder varied from 0:100 parts to 15:85 parts.

To 200 grams of water is added in sequence: 1 gram of Cellosize QP-4400 cellulosic thickener (Union Carbide), 0.5 grams of Proxel GXL preservative (ICI), 7.4 grams of Tamol 1124 dispersant (Rohm and Haas), 2.1 grams of Triton N-57 surfactant (Union Carbide), 30 grams of propylene glycol, 2 grams of Drewplus L-475 anti-foam (Drew), 45 grams of Omyacarb UF extender (Omya), and 175 grams of TiPure R-902 titanium dioxide pigment (DuPont). The mixture is ground at high speed using a dispersator until the slurry has a Hegman value less than 1 micron. The slurry is let down using 115 grams of water, 20 grams of SCT-275 (Rohm and Haas), and an amount of vinyl acrylic latex (55% solids) and first polymer (35% solids) identified in the table below, 13.5 grams of Filmer IBT coalescent (Union Carbide), 2 grams of Drewplus L-475 anti-foam (Drew), and 1.8 grams of 28% solution of ammonium hydroxide to make a 23% pigment volume concentration (PVC), 37.1% non-volatiles by volume (NVV) paint. Three mil paint films were let down on Leneta 3B chart and evaluated using the methods described above.

| Example | 1st Polymer | 1st Polymer/Vinyl Acrylic Latex Polymer (grams) | 60/20 Gloss | Block (7 day cure) |
|---|---|---|---|---|
| M1 | None | 0/410 | 26/3 | 3 |
| M2 | A12 | 62/348 | 23/2 | 8 |
| M3 | * | 348/62 | 29/3 | 5 |

*20% MAA, 20% EA, 50% MMA, 10% Styrene, 8% 2-EHMP

The above results show improvements in block resistance by using the isolated first polymer as a dispersant or additive in conventional paint formulations.

Example N

Comparative Example

A comparative example is prepared, using the procedure described below, in order to compare the alkali-soluble/alkali insoluble polymers disclosed in EP 0 587 333 A2 to Gill et al., to those of the present invention.

A 3-liter, jacketed flask equipped with a four-bladed stainless steel mechanical stirrer, Claissen connecting tube, Friedechs condensor, nitrogen sparge and bubble trap, thermometer, and monomer and initiator addition inlets is charged with 801 grams of water, 1.7 grams of sodium acetate and 1.7 grams of Aerosol OT surfactant (75% in water from Cytek). The reactor is heated to 85° C. while stirring and an initiator charge of 0.85 grams of ammonium persulfate dissolved in 15 grams of water is added to the reactor and stirred for two minutes. A monomer mixture containing 165.6 grams of water, 2.9 grams of Aerosol OT surfactant (75% in water from Cytek), 146.9 grams of butyl acrylate, 98.7 grams of methyl methacrylate, 86.4 grams of methacrylic acid, and 23.6 grams of t-dodecyl mercaptan is added to the reactor over a period of 95 minutes. At the same time, an initiator solution of 1.1 grams of ammonium persulfate in 60 grams of water is also added over the same period of time. The reaction temperature is maintained at about 85° C. until addition is complete, then the monomer lines are rinsed to the reactor with 54 grams of water. The reaction is held at 85° C. for an additional 30 minutes, then 61.8 grams of ammonium hydroxide (28%) and 79.7 grams of water are added to the reactor, and the reactor temperature brought back to about 85° C. An initiator solution of 0.85 grams of ammonium persulfate, 0.47 grams of Aerosol OT surfactant (75% in water from Cytek), and 48 grams of water is added and stirred two minutes. A second monomer mixture consisting of 140.4 grams of water, 8.9 grams of Aerosol OT surfactant (75% in water from Cytek), 410.4 grams of butyl acrylate, and 21.6 grams of N,N-dimethyl-2-aminoethyl methacrylate is added to the reactor over a period of 80 minutes. At the same time, an initiator solution of 0.43 grams of ammonium persulfate and 60 grams of water is also added over the same period. When the additions are complete, the monomer addition lines are again riinsed to the reactor with 24 grams of water and the reactor temperature held at 85° C. for 1 hour. The resulting latex product is cooled to below 35° C. and filtered through a coarse conical paint filter.

Examples N2 through N6 are prepared using the method described above in Example J. Paints are formulated using the procedure described in Example J, with the same evaluation procedures for Examples N1 through N6.

TABLE N

Comparative Example

| Ex. | 1st Poly. Composition | | | | | Theor. % Neutral. | 2nd Poly. Composition | | | |
|---|---|---|---|---|---|---|---|---|---|---|
| | BA | MMA | MAA | MAEU | Other | | BA | MMA | DMA—EMA | ALMA |
| *N1 | 34.00 | 46.00 | 20 | | 5.47 t-DDM | 70 | 95 | | 5 | |
| N2 | 6.60 | 66.50 | 14 | 3.75 | 8.4 EHMP | 115 | 47.4 | 52.4 | | |
| N3 | 6.60 | 65.30 | 14 | 3.75 | 7.5 EHMP | 115 | 47.4 | 52.4 | | |
| N4 | 6.60 | 66.50 | 14 | 3.75 | 8.4 EHMP | 115 | 47.3 | 52.4 | | 0.3 |
| N5 | 6.90 | 69.30 | 12 | 3.75 | 8.4 EHMP | 115 | 47.3 | 52.6 | | |
| N6 | 6.60 | 66.50 | 14 | 3.75 | 8.4 EHMP | 115 | 47.3 | 52.6 | | |

| Ex. | % 1st Poly. | % 2nd Poly. | Total Solids | Part. Size (nm) | Visc. (cps) | Gloss 20/60 | Wet Adh. | Scrub |
|---|---|---|---|---|---|---|---|---|
| *N1 | 50 | 50 | 36.50 | 190 | 1640 | 13/58 | <10 | <1000 |
| N2 | 20 | 80 | 48.40 | 60 | 3340 | 24/66 | >2000 | >2000 |
| N3 | 20 | 80 | 48.30 | 60 | 6850 | 9/52 | >2000 | >2000 |
| N4 | 20 | 80 | 48.40 | 60 | 2360 | 13/57 | >2000 | >2000 |
| N5 | 20 | 80 | 48.60 | 60 | 400 | 20/64 | >2000 | >2000 |
| N6 | 22.5 | 77.5 | 48.30 | 60 | 500 | 13/56 | >2000 | >2000 |

*Gill et.al. Example 19

The results show Comparative Example N1 having no wet adhesion.

Examples P1–P8

Blends of Latex Polymers of the Present Invention

A beneficial balance of properties can be achieved by blending various latex polymer compositions of the present invention. The latex compositions of P1 and P2 are prepared using the procedure described above in Example J. Paints are formulated using the procedure described in Example J, with the same evaluation procedures described in Example M.

TABLE P

Blends of Latex Polymers

| Example | 1st Polymer Composition | | | | | Theo. % Neut. |
|---|---|---|---|---|---|---|
| | BA | MMA | MAA | MAEU | EHMP | |
| P1 | 7.4 | 74.4 | 9.4 | 2.05 | 6.75 | 100 |
| P2 | 7.4 | 74.4 | 9.4 | 2.05 | 6.75 | 100 |

TABLE P-continued

Blends of Latex Polymers

| Example | 2nd Poly. Comp. | | % 1st Poly. | % 2nd Poly. | Total Solids | Part. Size (nm) |
|---|---|---|---|---|---|---|
| | BA | MMA | | | | |
| P1 | 61.5 | 38.5 | 30 | 70 | 49.7 | 70 |
| P2 | 30.1 | 69.9 | 36 | 70 | 49.5 | 80 |

| Example | Latex P1 | Latex P2 | Stormer (KU) | ICI (P) | Gloss 60/20 | Block 1 day | Block 2 day |
|---|---|---|---|---|---|---|---|
| P3 | 100 | 0 | 163 | 0.6 | 72/28 | 6 | 7 |
| P4 | 80 | 20 | 105 | 0.7 | 73/31 | 8 | 9 |
| P5 | 75 | 25 | 104 | 0.5 | 68/26 | 8 | 9 |
| P6 | 66.7 | 33.3 | 106 | 0.5 | 70/27 | 8 | 9 |
| P7 | 50 | 50 | 107 | 0.6 | 66/24 | 8 | 9 |
| P8 | 0 | 100 | 104 | 0.5 | 64/21 | 7 | 9 |

The results show latex P1 has the best gloss and the poorest block, while latex P2 has the best block and poorest gloss. Various combinations of the two polymers exhibit a good balance of both block and gloss, where block improves and gloss slightly decrease as the fraction of polymer P2 increases.

Example Q1–Q4

Synthesis of Second Polymer Using a First Polymer Made by Solution Polymerization and PI for Wet Adhesion The following examples illustrate the use of a substantially dissolved first polymer, made by solution polymerization, as a medium for emulsion polymerization of a second polymer; and the use of propylene imine to impart wet adhesion.

The components listed below in Table Q are prepared using the emulsion polymerization process of Example B1, except the first polymer of Example A1 is replaced on a solids basis with the commercially available water soluble carboxylated styrene/acrylic polymer (Morez 132 polymer, available from Morton International as an alkaline aqueous 32% solids solution). The resulting latexes are formulated into the high gloss paint formulation of Example C1, and performance properties are measured using the tests described in Example G1.

Where indicated, certain finished latexes of Table Q are heated to 80° C., and an amount of a dilute solution of propylene imine (29%) is added under stirring to provide the level of PI indicated in Table Q. After allowing the PI to react for one hour, residual propylene imine is verified to be below 1 ppm, by gas chromatography, before cooling and bottling the latex.

TABLE Q

Wet Adhesion Properties Of Latexes Reacted With Propylene Imine

| Example | phr 1st Polymer | % Styrene 2nd Polymer | % BA 2nd Polymer | % EHA 2nd Polymer | phr PI |
|---|---|---|---|---|---|
| Q1 | 22 | 45 | 0 | 55 | 0 |
| Q2 | 22 | 45 | 0 | 55 | 1.8 |
| Q3 | 22 | 70 | 30 | 0 | 0 |
| Q4 | 22 | 70 | 30 | 0 | 0.9 |

Table R shows how blends of latexes from Table Q perform in the above described tests.

TABLE R

Wet Adhesion Properties Of Blends Of Latexes From Table Q

| Ex. | Latex 1 | Latex 2 | Blend Ratio Latex 1:Latex 2 | Gloss 20/60 | *Block Rating | **Wet Adhesion |
|---|---|---|---|---|---|---|
| R1 | Q1 | None | — | 54/85 | 3 | 1/300 |
| R2 | Q2 | None | — | 54/87 | 7 | 1756/>2000 |
| R3 | Q3 | None | — | 32/80 | 10 | 1/200 |
| R4 | Q4 | None | — | 42/85 | 10 | 90% @ 2000/>2000 |
| R5 | Q1 | Q3 | 2:1 | 42/82 | 9 | 1/250 |
| R6 | Q2 | Q4 | 2:1 | 42/85 | 9 | 30% @ 2000/>2000 |
| R7 | Q2 | Q4 | 1:1 | 43/86 | 9 | 98% @ 2000/>2000 |

*Block Rating: 24 hours dry at 1 psi, face-to-face; scale 1–10 (10 = no tack, <4 = film failure)
**Wet Adhesion: 7 mil wet film cast over gloss alkyd, air dry then crosshatch film into ¼" squares (4 × 40 test area), then 30 minute water soak followed by Gardener Washability/Scrub Machine with bristle brush using 5% lava soap solution (pH = 9.5). Results reported as cycles to failure, or % of coating remaining at 2000 cycles, or >2000 cycles if 100% of coating remains at 2000 cycles.

Example S

Blends of Latexes of the Present Invention with Conventional Latexes

In the following examples, a latex blend is prepared by mixing 3 parts of a commercial vinyl acrylic latex (379G Latex available from Union Carbide Corporation) with 1 part of a latex S, similar in composition to Example N6 (20 phr 1st polymer instead of 22.5 phr; 100% neutralization instead of 115%). A pigment slurry is prepared by mixing the following in order, and then grinding on a high speed disperser until a fine dispersion is formed: 94 grams of water, 8 grams of UCAR® POLYPHOBE® 102 thickener (Union Carbide Corporation), 1 gram of Surfynol CT-111 surfactant (Air Products); 11.6 grams of Tamol 1124 surfactant (Rohm & Haas), 2.1 grams of Nuosept 95 preservative (Huls Co.); 44 grams of propylene glycol; 2.8 grams of Drew L-475 defoamer (Drew Chemical); 4 grams of AMP-95 neutralizing agent (Angus Co.); and 300 grams of Ti-Pure R-706 titanium dioxide pigment (DuPont).

A paint is prepared by adding the following to the pigment grind: 98 grams of water; 26 grams of UCAR Filmer IBT coalescent (Union Carbide Corporation); 354 grams of UCAR Latex 376G polymer (Union Carbide Corporation); and 125 grams of latex S. The viscosity of this paint is adjusted by adding a solution of UCAR® POLYPHOBE® 114 thickener (Union Carbide Corp., 1 gram in 22 grams water). The resulting paint has a pigment volume concentration of 23.7%, a volume solids of 38%, a density of 10.9 pounds/gallon, and 165 grams of VOC/liter.

The following properties are obtained.: After 24 hours, the equilibrated viscosities are 89 KU Stormer viscosity, 1.1 Poise ICI viscosity, and 220 Poise Brookfield viscosity. A paint film prepared following the procedure described in earlier examples has glosses of 59/88 at 20/60 degrees, a block resistance of 0/1/2 after 1/2/3 days dry time, wet adhesion of >2000 cycles, and a scrub resistance of >3000 cycles. The high gloss and wet adhesion properties are attributable to Latex S, while the block resistance properties reflect the use of vinyl acrylic, and the high scrub resistance results from both polymers.

What is claimed is:

1. A polymer composition comprising a second polymer obtained by emulsion polymerizing monomers in the presence of a solubilized emulsion polymerized first polymer, said first polymer comprising at least one acid or anhydride functional monomer or other monomer that imparts alkaline solubility, at least one comonomer and a wet adhesion promoter.

2. The polymer composition of claim 1 wherein said first polymer has been solubilized by addition of a base or neutralizing agent.

3. The polymer composition of claim 1 wherein said first polymer contains less than 20 percent acid or anhydride monomer based on the total weight of monomers.

4. The polymer composition of claim 1 wherein said first polymer has a number average molecular weight of less than about 20,000 as determined by gel permeation chromatography.

5. A polymer composition comprising a second polymer, a solubilized emulsion polymerized first polymer, and a wet adhesion promoter; wherein said second polymer comprises butyl acrylate and methyl methacrylate; wherein said first polymer comprises methacrylic acid, butyl methacrylate and methyl methacrylate; and wherein said wet adhesion promoter comprises methacrylamidoethyl ethylene urea.

6. A latex paint composition comprising water, pigment and the polymer composition of claim 1.

7. An aqueous composition comprising water and the polymer composition of claim 1.

8. A latex composition comprising water and from about 0.1 to about 99.9 percent by weight, based on the total weight of the polymer content of said latex composition, of the polymer composition of claim 1 and from about 99.9 to about 0.1 percent by weight of a latex polymer.

9. A process for preparing a polymer composition comprising emulsion polymerizing in a first stage a mixture of monomers containing at least one acid or anhydride functional monomer or other monomer that imparts alkaline solubility, at least one comonomer, and a wet adhesion promoter to produce a first polymer;

adding a base or neutralizing agent to solubilize said first polymer; and in a second stage, emulsion polymerizing a monomer or mixture of monomers in the presence of said solubilized first polymer.

10. A process for preparing a polymer composition comprising emulsion polymerizing in a first stage a mixture containing methacrylic acid, butyl acrylate, methyl methacrylate, and methacrylamidoethyl ethylene urea, to produce a first polymer;

adding a base or neutralizing agent to solubilize said first polymer;

in a second stage, emulsion polymerizing a mixture containing butyl acrylate and methyl methacrylate in the presence of said solubilized first polymer.

* * * * *